United States Patent
van den Berg

[11] 3,805,503
[45] Apr. 23, 1974

[54] WINDROW TURNER
[75] Inventor: Pieter van den Berg, Wilson, N.C.
[73] Assignee: The Lely Corporation
[22] Filed: Apr. 13, 1972
[21] Appl. No.: 243,797

Related U.S. Application Data
[63] Continuation of Ser. No. 70,308, Sept. 8, 1970, abandoned.

[52] U.S. Cl. .............................................. 56/366
[51] Int. Cl. ............................................ A01d 81/00
[58] Field of Search ............................ 56/366, 377

[56] References Cited
FOREIGN PATENTS OR APPLICATIONS
940,622 10/1963 Great Britain ...................... 56/366
1,194,577 6/1970 Great Britain ...................... 56/377

Primary Examiner—Louis G. Mancene
Assistant Examiner—J. A. Oliff
Attorney, Agent, or Firm—Mason, Mason & Albright

[57] ABSTRACT

A windrow turner having a frame connectable to the three-point hitch of a tractor. The frame includes a beam assembly supporting two rake wheels to the rear and laterally of the prime mover. One beam with a bent end can be adjusted in a transverse direction and fixed in a plurality of positions. The rake wheels are mounted on a frame support with a bearing that pivots the wheels to a transport position.

8 Claims, 2 Drawing Figures

WINDROW TURNER

This is a continuation of application Ser. No. 70,308 filed Sept. 8, 1970, and now abandoned.

With the construction according to the invention a very simple and cheap machine can be obtained which can handle a wide variety of crops and can work with a high speed.

In accordance with the invention there is provided a windrow turner of the kind set forth which comprises only two rake wheels.

For a better understanding of the invention and to show how the same may be readily carried into effect, reference is made, by way of example, to the accompanying drawing.

Figure 2:
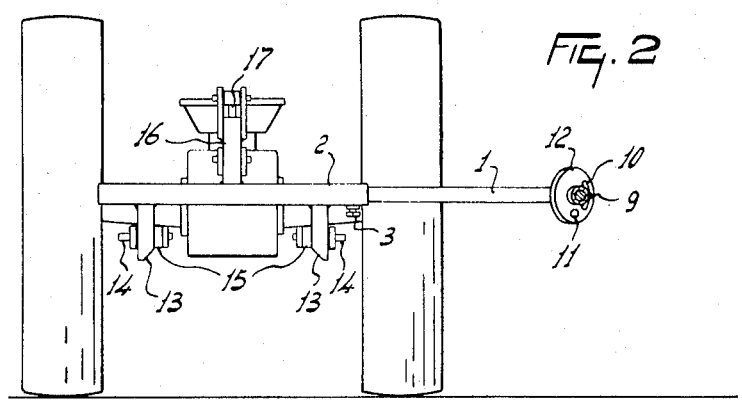
FIG. 2 is a section taken on the line II—II in FIG. 1.

The machine shown in the figures relates to a windrow turner provided with a frame which comprises a supporting beam 1 extending transverse to the intended direction of travel and with one end being adjustable in a beam 2. Both the supporting beam 1 and the beam 2 have an angular section which preferably is square. By means of a clamping bolt 3 the supporting beam can be fixed in a number of positions with respect to the beam 2. Towards its free end facing away from the beam 2, the supporting beam 1 is bent obliquely forwardly and provided with a bearing 4. A support 6 is pivotally supported by means of a tap 5 in the bearing 4. The support 6 is bow-like whereby the free ends extend parallel to the stub shaft 5 and obliquely to the intended direction of travel of the machine. Each free end of the bow-like support 6 affords a stub shaft for a rake wheel 7 of a known construction. The stub shafts are arranged in such a way that the rake wheels 7, viewed in the direction of intended travel of the machine, are overlapping and, during operation, crop displaced by the foremost rake wheel is guided to the rearmost rake wheel. On the bearing 4 is mounted a strip 8 which is provided with a hole in which a pin 9 can be introduced. The pin 9 can co-operate with a slot 10 or a hole 11 in a flange 12 on the stub shaft 5 (FIG. 2). The beam 2 is provided with supports 13 which extend downwardly and are provided with pins 14 each of which can be coupled with the lowermost arm 15 of the three-point hitch of a tractor. Between the supports 13 on the uppermost side of the beam 2 a support 16 is provided which can be coupled with the uppermost arm 17 of the three-point hitch.

Figure 1:
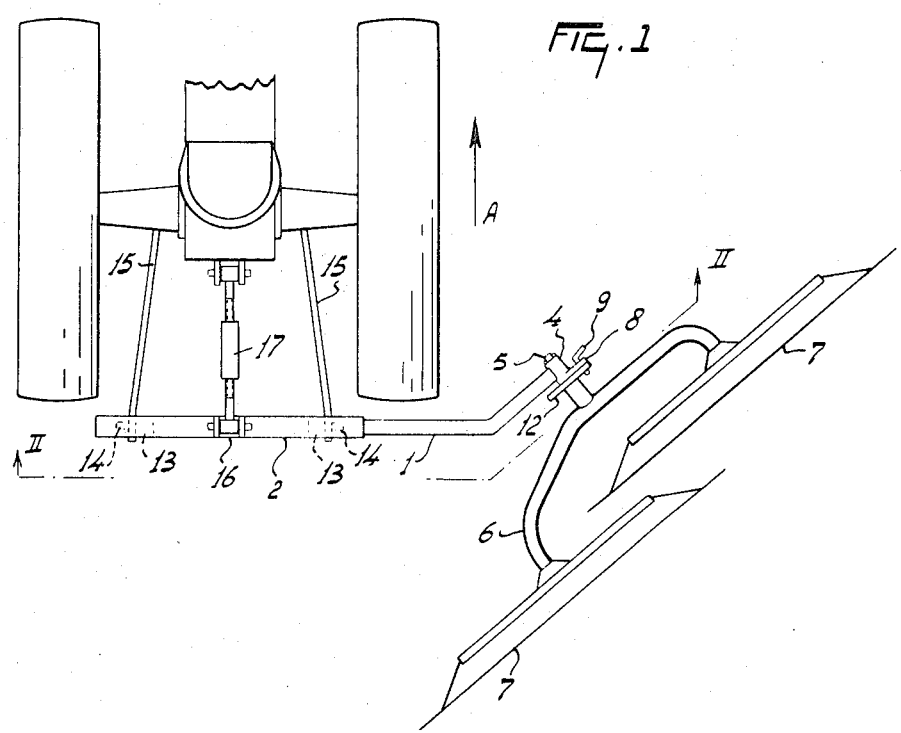
FIG. 1 is a plan view of a machine according to the invention.

During operation the machine by means of the beam 2 is coupled to the three-point hitch of a tractor and is moved in the direction indicated by the arrow A in FIG. 1. Hereby the supporting beam 1 has been brought into a position determined by the wheel spacing of the tractor whereby the rake wheels are arranged in a position as indicated in FIG. 1. In this position the rake wheels can turn a windrow gently and thoroughly whereby the crop at the rear of the tractor is brought on a strip of ground over which the tractor travels. During operation the rake wheels can follow the contour of the ground owing to the fact that the support 6 is pivotable about the stub shaft 5 and the pin 9 is inserted in the slot 10. To bring the machine into a transport position, the support 6 can be pivoted over an angle of 90° and the pin 9 can be introduced in the hole 11. By means of the supporting beam 1 which is adjustable in a transverse direction the frame is telescoping which adjusts for tractors with different wheel spacings.

The machine described hereinbefore is of very compact and simple construction so that it is cheap and can be easily connected to the three-point hitch of a tractor. No front frame modifications or mounting kits are required. Because of rear mounting, hydraulic permits greater versatility in the field. During operation the machine can be driven with high speed so that the crop can be handled efficiently.

Having thus described our invention, what we claim as new and desire to secure by Letters Patent of the United States is:

1. A windrow turner for pivotal connection to a three point lifting hitch of a prime mover, comprising a frame and a pair of rake wheels supported on said frame, said frame having a frame beam directly connected to the lower two points of the hitch and a supporting beam with a bent end carrying the rake wheels obliquely to the rear and to one side of the prime mover, said supporting beam being received in said frame beam and both beams extending parallel to a line through the lower two connection points of the hitch, said rake wheels being mounted on a support connected to said bent end, the latter having a bearing that receives a stub shaft of said support, said support and rake wheels being turnable relative to the frame during operation.

2. A windrow turner as claimed in claim 1, wherein said stub shaft is rotatable in said bearing and the latter has fixing means that restricts the amount of rotation of said support relative to said supporting beam.

3. A windrow turner as claimed in claim 2, wherein said fixing means includes a pin and slot connection adjacent said stub shaft and said bearing.

4. A windrow turner as claimed in claim 1, wherein said support is bow shaped with a rake wheel mounted at each end thereof.

5. A windrow turner for pivotal connection to a three point lifting hitch of a prime mover, comprising a frame and a pair of rake wheels supported on said frame, said frame consisting essentially of a frame beam directly connected to the lower two points of the hitch and a supporting beam with an end bent forwardly which carries the rake wheels obliquely to the rear and to one side of the prime mover, said supporting beam being slideably received in said frame beam and both beams extending parallel to a line through the lower two connection points of the hitch, said rake wheels being mounted on a support connected to said bent end, the latter having a bearing that receives a stub shaft of said support, said support and rake wheels being turnable relative to the frame during operation.

6. A windrow turner as claimed in claim 5, wherein said frame beam is affixed to two downwardly extending pivot supports for connection to the two lowermost points of said three point hitch of the prime mover.

7. A windrow turner as claimed in claim 6, wherein said frame beam has an upper support pivotably connected to the upper point of the hitch.

8. A windrow turner as claimed in claim 5, wherein said frame beam and said supporting beam have angular sections which are substantially square in configuration and said supporting beam is interfitted in said frame beam and adjustable in a lateral direction.

* * * * *